(12) United States Patent
Weeks (10) Patent No.: US 10,705,013 B2
(45) Date of Patent: Jul. 7, 2020

(54) ADHESIVE TESTING SYSTEMS AND METHODS

(71) Applicant: The Boeing Company, Chicago, IL (US)

(72) Inventor: Carl Anthony Weeks, Wadmalaw Island, SC (US)

(73) Assignee: The Boeing Company, Chicago, IL (US)

( * ) Notice: Subject to any disclaimer, the term of this patent is extended or adjusted under 35 U.S.C. 154(b) by 228 days.

(21) Appl. No.: 15/681,289

(22) Filed: Aug. 18, 2017

(65) Prior Publication Data

US 2019/0056306 A1 Feb. 21, 2019

(51) Int. Cl.
*G01N 19/04* (2006.01)
*G01N 3/04* (2006.01)

(52) U.S. Cl.
CPC ............... *G01N 19/04* (2013.01); *G01N 3/04* (2013.01); *G01N 2203/0017* (2013.01); *G01N 2203/0091* (2013.01); *G01N 2203/0405* (2013.01); *G01N 2203/0423* (2013.01); *G01N 2203/0447* (2013.01)

(58) Field of Classification Search
CPC .................. G01N 19/04; G01N 2203/0091
See application file for complete search history.

(56) References Cited

U.S. PATENT DOCUMENTS

| | | | |
|---|---|---|---|
| 3,788,135 A | 1/1974 | Hammond, Jr. | |
| 5,513,537 A | 5/1996 | Brooks et al. | |
| 2003/0015031 A1* | 1/2003 | Nelson | G01N 19/04 73/150 A |
| 2008/0202254 A1* | 8/2008 | Deng | G01N 3/24 73/827 |
| 2012/0103081 A1 | 5/2012 | Hoshino | |
| 2012/0123700 A1 | 5/2012 | Tsaur | |
| 2014/0000356 A1 | 1/2014 | Matlack et al. | |
| 2014/0326074 A1* | 11/2014 | Van Voast | G01N 19/04 73/827 |
| 2016/0003722 A1* | 1/2016 | Kombolias | G01N 3/08 73/827 |

(Continued)

FOREIGN PATENT DOCUMENTS

| | | |
|---|---|---|
| DE | 102012100618 A1 | 7/2013 |
| EP | 2977745 A1 | 1/2016 |
| JP | S56108937 A | 8/1981 |

OTHER PUBLICATIONS

European Patent Office, Extended European Search Report in European Patent Application No. 18187702.8-1001, dated Feb. 5, 2019, 9 pages.

(Continued)

*Primary Examiner* — Clayton E. LaBalle
*Assistant Examiner* — Dennis Hancock
(74) *Attorney, Agent, or Firm* — Kolisch Hartwell, P.C.

(57) ABSTRACT

A system for testing adhesive is disclosed, comprising a pull testing machine and a rigid spine. The rigid spine has a face extending along a longitudinal axis between a first and second projection, and one of the projections is moveable relative to the other. The face is configured to support a substrate, with a flexible media adhered to the substrate. The rigid spine also has a coupler configured to connect the spine to the pull testing machine.

20 Claims, 9 Drawing Sheets

(56) References Cited

U.S. PATENT DOCUMENTS

| | | | |
|---|---|---|---|
| 2016/0139031 A1* | 5/2016 | Landrum | G01N 19/04 73/150 A |
| 2016/0327471 A1* | 11/2016 | Padhye | G01N 19/04 |
| 2017/0030826 A1* | 2/2017 | Neary | G01N 19/04 |
| 2018/0335379 A1* | 11/2018 | Stevens | G01N 3/08 |

OTHER PUBLICATIONS

Roy et al., Towards a better understanding of the cathodic disbondment performance of polyethylene coatings on steel—Fig. 3. Schematic of the 90° peel test rig., Jan. 2002, retrieved from the internet on Jun. 20, 2017 at URL: https://www.researchgate.net/figure/229643236_fig3_FIGURE-3-Schematic-diagram-of-the-90-peel-test, 2 pages.

International Standard, ISO 8510-2 Second Edition; Adhesives—Peel test for a flexible-bonded-to-rigid test specimen assembly, Dec. 1, 2006, 12 pages.

D. K. Cai, et al., Realization of Electrical-Optical-Circuit-Board Self-packaging—Fig. 5. Schematic of 180°-peel-off test, Jul. 2007, retrieved from the internet on Jun. 20, 2017 at URL: https://www.researchgate.net/figure/224714240_fig1_Fig-5-Schematic-of-180-peel-off-test, 2 pages.

SAE International, AS5127/1C—Aerospace Standard Test Methods for Aerospace Sealants Two-Component Synthetic Rubber Compounds, Revised Oct. 2014, 44 pages.

ASTM International, C794-15a, Standard Test method for Adhesion-in-Peel of Elastomeric Joint Sealants, Jul. 1, 2015, 7 pages.

ADMET, ASTM D3330 Testing Standards, retrieved from the Internet on Jun. 20, 2017 at URL: http://www.admet.com/testing-applications/testing-standards/astm-d3330-tape-adhesion-strength-testing/, 8 pages.

Journal of Pharmacy & Bioallied Sciences, Figure 4: Simplified representation of a typical test set-up used to determine peel strength of bioadhesive files, retrieved from the internet on Jun. 20, 2017 at URL: http://www.ipbsonline.org/viewimage.asp?img=JPharmBioallSci_2011_3_1_89_76478_f7.jpg, 1 page.

Test Resources, PSTC-101 Peel Adhesion Test Equipment for Pressure-Sensitive Tape (PSA), retrieved from the internet on Jun. 20, 2017 at URL: http://www.testresources.net/applications/standards/pstc/pstc-101-afera-5001-test-equipment-machines-fixtures-peel-adhesion-of-pressure-sensitive-tape-psa/, 13 pages.

Test Resources, Tape Testing in Accordance with ASTM D3330, retrieved from the internet on Jun. 20, 2017 at URL: http://www.testresources.net/applications/test-types/peel-test/tape-testing-in-accordance-with-astm-d3330/, 9 pages.

\* cited by examiner

ADHESIVE TESTING SYSTEMS AND METHODS

FIELD

This disclosure relates to systems and methods for adhesive testing. More specifically, the disclosed examples relate to testing adhesive strength, cohesive strength, and failure rates of sealants and adhesives.

INTRODUCTION

Peel testing is an important step in both development and selection of adhesives or sealants. Standard tests include adhesive strength and cohesive strength as well as rates for each failure mode at a benchmark strength. Peel testing is commonly conducted on either two adhered flexible media, or flexible media adhered to a solid substrate. For the latter, tests are primarily in either a 180 degree or a 90 degree configuration. Testing equipment specifically designed for peel testing is available, but can be costly and require additional lab space and training for personnel. Commonly, each of the 180 degree and 90 degree tests require separate equipment. Tensometers include sensors equivalent to those in peel testing equipment, and can be used for 180 degree peel tests. However, available grips for tensometers are not ideal for holding peel test media and substrate.

When held by a tensometer grip, a test substrate can bow and alter the angle between the pulled flexible media and the substrate by up to 20 degrees. Alteration of the angle reduces the accuracy of a test. Difference in bowing between substrate materials and thicknesses can also prevent effective comparison of results across different test substrates. Fragile or thin substrates can even be damaged by the tensometer grips and testing forces.

SUMMARY

A system for testing adhesive is disclosed, comprising a pull testing machine and a rigid spine. The pull testing machine includes first and second attachment devices, and a drive assembly configured to move one of the attachment devices relative to the other along a pulling axis.

The rigid spine has a face extending along a longitudinal axis between a first and second projection, and one of the projections is moveable relative to the other. The face is configured to support a substrate, with a flexible media adhered to the substrate. The rigid spine also has a coupler configured to connect the spine to the pull testing machine.

A rigid spine is also disclosed as a grip device for supporting a test article in a peel testing machine. A method of performing a peel test includes clamping a pull test substrate on a rigid spine, connecting the spine to a pull test machine, and pulling a flexible sheet adhered to the substrate in a pulling direction.

The present disclosure provides systems, apparatuses, and methods relating to a system for testing adhesive. In some examples, a system for testing adhesive may include a rigid spine with a planar face. In some examples, a rigid spine may include a retaining nut to secure a connection of the coupler. In some examples, the first and second projections may each form an angle of less than 90 degrees with the longitudinal axis.

Features, functions, and advantages may be achieved independently in various examples of the present disclosure, or may be combined in yet other examples, further details of which can be seen with reference to the following description and drawings.

DESCRIPTION

Various aspects and examples of a system for testing adhesive including a rigid spine, as well as related methods, are described below and illustrated in the associated drawings. Unless otherwise specified, a system for testing adhesive and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components.

Directional terms such as "up," "down," "vertical," "horizontal," and the like should be understood in the context of the particular component. For example, a rigid spine may be oriented around defined X, Y, and Z axes. In those examples, the X-Y plane will define horizontal, with up being defined as the positive Z direction and down being defined as the negative Z direction.

Overview

In general, a system for adhesive testing may include a pull test machine and a rigid spine. The rigid spine may be configured to secure a test substrate between two opposing projections, with a first end of a flexible media adhered to the test substrate and a second end of the flexible media coupled to an attachment of the pull test machine. The rigid spine may be coupled to another attachment of the pull test machine, the pull test machine being configured to move the two attachments apart. The system may be used to perform a variety of non-standardized tests, or tests conforming to various peel test standards such as ASTM C794-15a available from the American Society for Testing and Materials International (www.astm.org), SAE AS5127/1C available from the Society of Automotive Engineers International (www.sae.org), and BS EN ISO 8510-2 available from the British Standard/European Standard/International Organization for Standardization (www.iso.org).

Examples, Components, and Alternatives

The following sections describe selected aspects of exemplary systems for testing adhesive as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. First Illustrative System

As shown in FIGS. 1-7, this section describes a 180 degree peel test system 10. System 10 is an example of a system for adhesive testing as described above. The pull testing machine in this exemplary system is a tensometer 12, also known as a tensile tester or a tension measuring device. Tensometer 12 includes an upper boom 16 with an attachment point 18 and a lower boom 20 with a lower attachment point and attached grip 22. The upper boom is raised by a drive assembly 24, moving the attachment point relative to the grip along a pulling axis 26. Any tensometer with desired specifications and configuration may be used. For example, drive assembly 24 may move grip 22 relative to attachment point 18. In another example, tensometer 12 may be horizontal and have a left attachment and a right attachment that are translated relative to one another. In some examples, other types of pull testing machine may be used.

Figure 1:
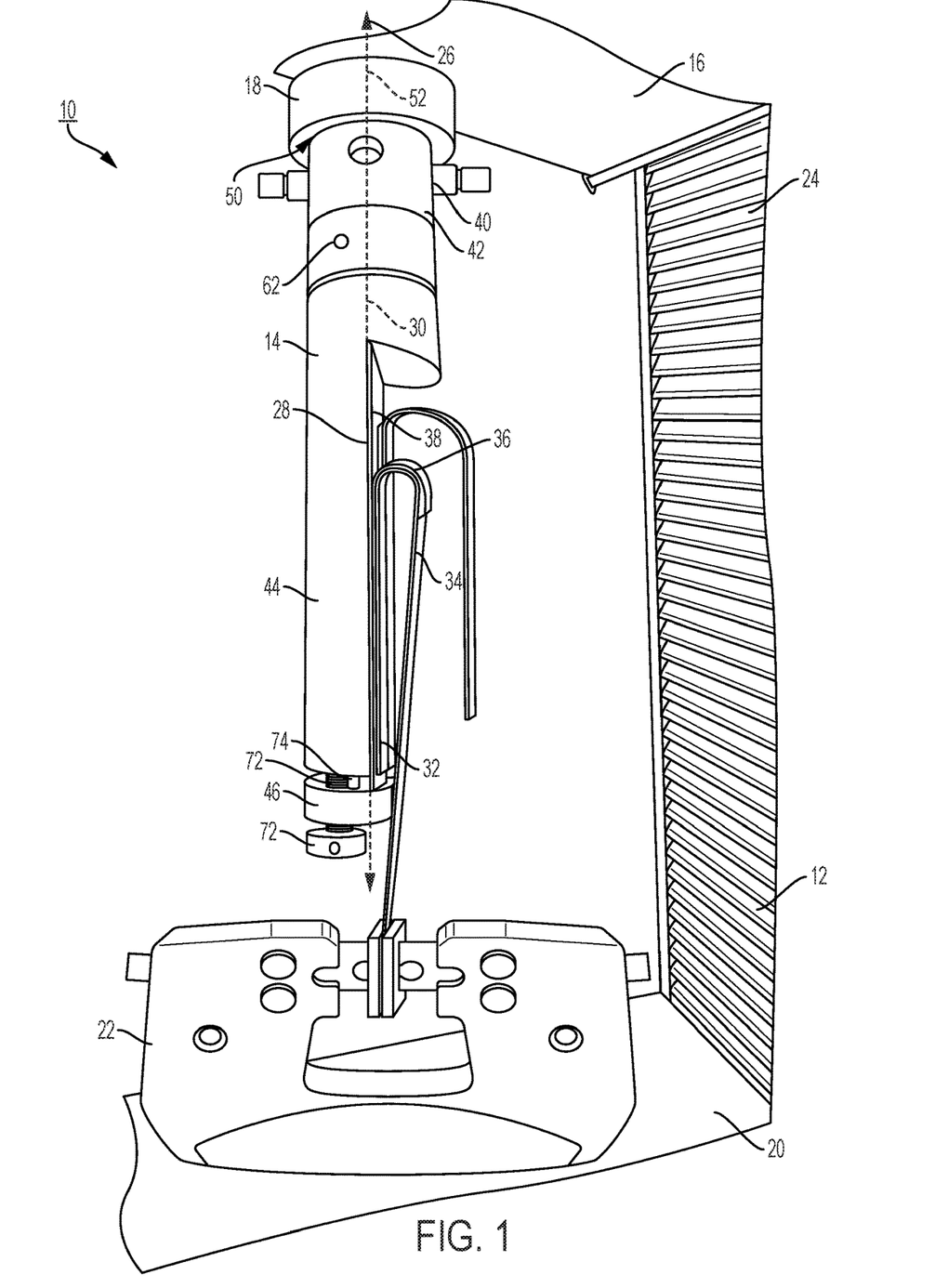
FIG. 1 is an isometric view of an exemplary system for adhesive testing.

In the present example, the rigid spine is a jig 14, which is coupled to attachment point 18. As shown in FIG. 1, jig 14 includes a face 28 that is planar and defines a longitudinal axis 30. In the pictured example, jig 14 is coupled to attachment point 18 such that longitudinal axis 30 is parallel to pulling axis 26. A test panel 32 is held by jig 14, parallel to longitudinal axis 30. The test panel includes a flexible peel media 34 adhered by an adhesive or a sealant 36 to a substrate 38. The peel media extends down from test panel 32 to be gripped by grip 22, for a 180 degree peel test.

Figure 2:
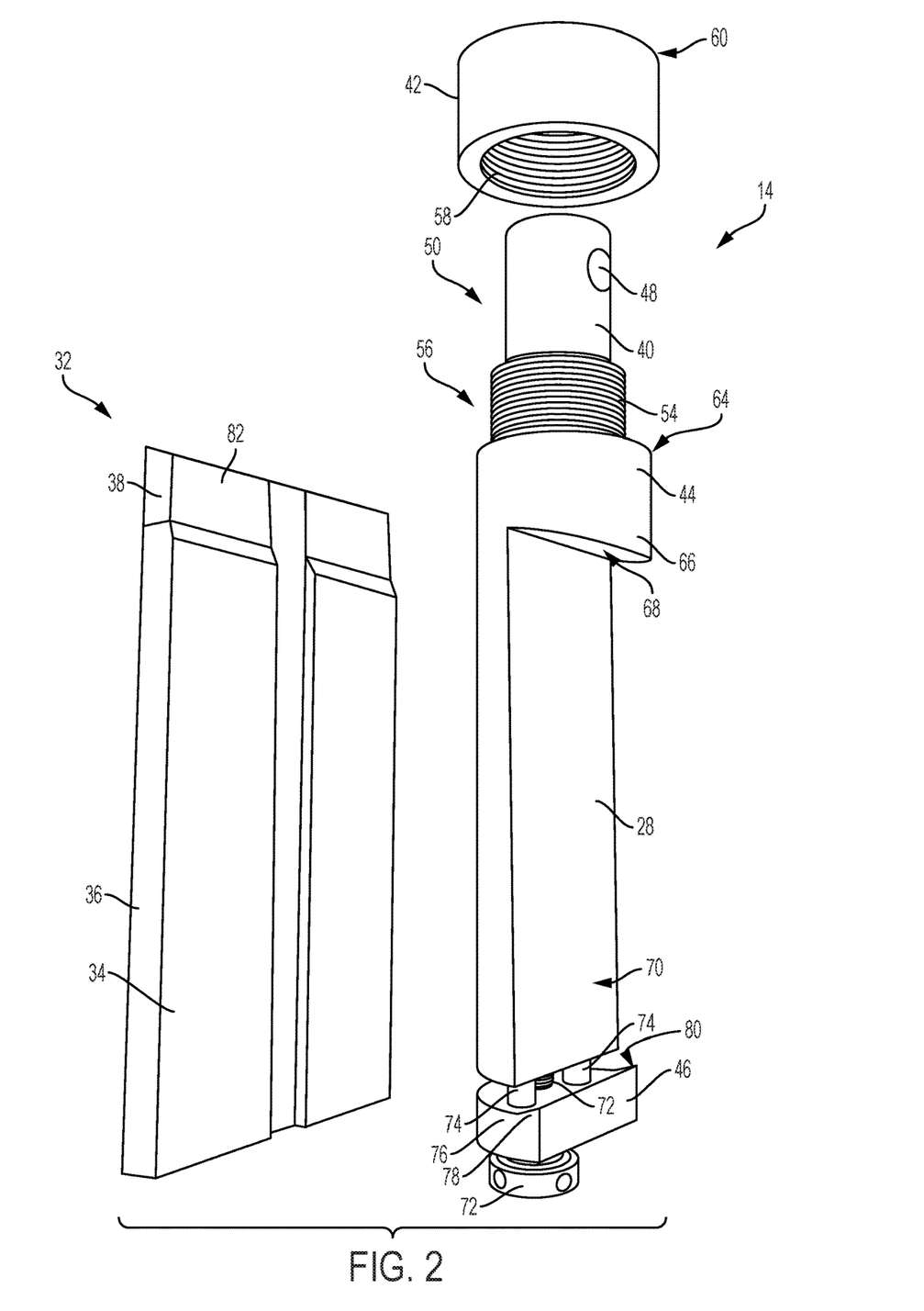
FIG. 2 is an exploded isometric view of the jig and test panel of FIG. 1.

Jig 14 and test panel 32 can be seen in more detail in FIG. 2, which is an exploded isometric view. The jig includes a coupler 40, a retaining nut 42, a main body 44, and an adjustable foot 46. In the pictured example, coupler 40 is formed on main body 44 as a unitary part. The coupler is cylindrical in shape, and configured to interface with attachment point 18 of tensometer 12.

As shown in FIG. 2, a coupling aperture 48 extends laterally through a distal end 50 of coupler 40, perpendicular to longitudinal axis 30. Coupling aperture 48 is sized to receive a pin of a pin-style tensometer grip. In other examples, coupler 40 may instead be threaded to mate with a threaded tensometer grip, or may have any geometry or connection features appropriate to facilitate a firm connection with an attachment point of a tensometer. Coupler 40 further includes a threaded portion 54 at a proximal end 56. Retaining nut 42 has internal threads 58 and is sized to mate with threaded portion 54 of coupler 40.

Referring again to FIG. 1, jig 14 may include any coupler appropriate for connection to tensometer 12. Coupler 40 may be unitary, or may include multiple components. The coupler may be rigid, or may allow movement of main body 44 such as rotation, extension, or pivoting relative to the tensometer. In some examples, coupler 40 may include a joint or other mechanism allowing longitudinal axis 30 of main body 44 to be secured at a plurality of angles relative to pulling axis 26 of tensometer 12. In some examples, coupler 40 may be removable from main body 44, and in such examples may be selectable from a set of couplers appropriate for multiple tensometers or tensometer attachments. In other examples, coupler 40 may include features to facilitate connection with multiple types of tensometers, or tensometer attachments.

As shown in FIG. 2, coupler 40 is formed on a top end 64 of main body 44, which has a generally cylindrical shape. Face 28 extends into the main body to form a main projection 66. In some examples, face 28 may not be planar. For example, the face may be contoured to conform to and support a curved test panel. For another example, face 28 may include a ridge structure extending along the length of the face, which may separate the face into multiple longitudinal lanes.

In the pictured example, main projection 66 has a flat inner face 68 that forms an acute angle with face 28. Face 28 extends from main projection 66 to a bottom end 70 of main body 44. That is, at top end 64 main body 44 has a circular cross section, but at bottom end 70 the main body has a semicircular cross section. In some examples, main body 44 may have a rectangular cross section, with one dimension longer at top end 64 than at bottom end 70. Main body 44 may also have any cross-section or be of any size that is effective as a rigid support.

Adjustable foot 46 is connected to main body 44 by an adjustment screw 72 and two guide rods 74. At bottom end 70, main body 44 includes multiple apertures, not pictured. A central threaded aperture is sized to receive adjustment screw 72, while two smooth apertures are sized to receive guide rods 74. The apertures may extend 2 inches, may extend between 1 and 5 inches, or may be any appropriate depth.

Adjustable foot 46 includes a body portion 76 and a lower projection 78. The body portion is shaped to match the cross section of main body 44 at bottom end 70, while lower projection 78 extends out past face 28 when assembled with main body 44. The lower projection has a flat inner face 80 that forms an acute angle with face 28.

Adjustment screw 72 extends through foot 46 into main body 44 to secure the foot to the main body. The foot may be held in a plurality of positions relative to the main body, corresponding to a plurality of distances from main projection 66 to lower projection 78. Together main body 44 and foot 46 may act as a clamp to secure test panel 32, with main projection 66 as a first jaw and lower projection 78 as a second jaw. Test panel 32 may be thereby secured against face 28.

Adjustment screw 72 may have a cylindrical head appropriate for manual manipulation, which may include knurling or texturizing for improved grip. The adjustment screw may include one or more tooling recesses, accessible from below the screw or from a direction perpendicular to the extent of the screw.

In the pictured example, foot 46 may be held in a continuous plurality of positions. In other examples, foot 46 may be held in a discrete plurality of positions. Foot 46 may be secured to main body 44 by a screw, by a nut and bolt, or by any adjustable or removable means. For example, foot 46 may include a ratcheting member to be received by an aperture of main body 44, such that foot 46 may be ratcheted between multiple discrete positions. Foot 46 may be entirely removable from main body 44, or may be permanently attached to the main body.

Guide rods 74 extend from foot 46 into main body 44, as shown in FIG. 2. The rods may allow foot 46 to move freely along one axis, while preventing rotation or translation on other axes. That is, guide rods 74 may maintain relative orientation between foot 46 and main body 44 as adjustment screw 72 is turned to draw the foot closer to the main body. In the present example, two guide rods are included, but other examples may include one, three, or any number of guide rods. In some examples, guide rods 74 may be formed on main body 44 and be received in corresponding apertures of foot 46. Jig 14 may not include guide rods and/or may include other means to facilitate a desired relative orientation between foot 46 and main body 44.

As shown in FIG. 2, test panel 32 includes two test strips on substrate 38. Each test strip includes a length of peel media 34 adhered to substrate 38 by sealant 36. At a top end of each test strip, a tail section 82 of peel media 34 is left un-adhered to substrate 38. In FIG. 2, tail section 82 of peel media 34 is shown as extending only to an end of test panel 32. For testing, tail section 82 may be of sufficient length to be secured to grip 22 when test panel 32 is held by jig 14, and jig 14 is connected a tensometer attachment point.

Figure 3:
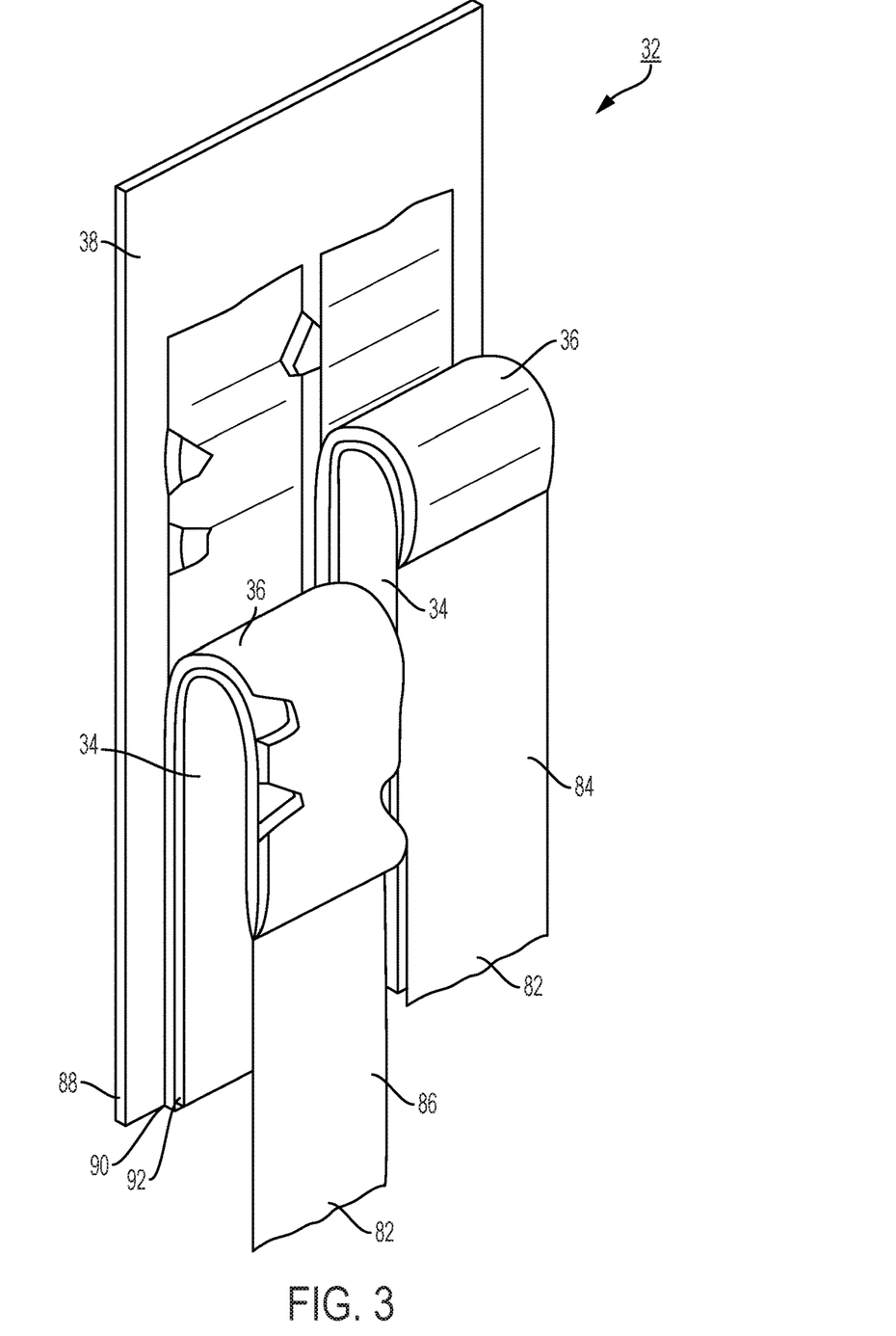
FIG. 3 is a diagrammatic representation of an adhesive and cohesive failure test.

FIG. 3 is an illustration of test panel 32 partway through a testing procedure. Test panel 32 is rectangular in shape, and measures about 6 inches by 3 inches. The test panel includes two 1 inch testing strips, extending the length of the panel. Test panel 32 may also be any desired size or shape, and include any effective arrangement of test materials.

In the illustrated procedure, a sealant is tested for adhesive and cohesive failure. The two strips on substrate 38 are an adhesion strip 84 and a cohesion strip 86. In other examples, a test panel may include one, two, or any number of strips. Two or more strips may be tested simultaneously, or multiple strips may be tested individually and in sequence. A 180 degree peel test is depicted in FIG. 3. Test panel 32 may also be subjected to 90 degree peel tests, or tests at any desired angle.

Adhesion strip 84 shows a series of equally spaced notches. In the illustrated procedure, as the strip is peeled a knife is used to cut under peel media 34 through sealant 36 at approximately 45 degrees. The cut is repeated at regular intervals down the length of adhesion strip 84 to allow the sealant to recover. Cohesion strip 86 is only cut when cohesive failure occurs. Cutting is one technique that may be used to achieve specific desired testing conditions, or to induce a failure mode of interest. In other adhesive tests, cutting may be used differently or may not be used. Adhesive testing may conform to a testing standard, or may be customized to approximate specific conditions.

Substrate 38 of test panel 32 may be of any rigid material, and may be chosen to match or be similar to a material on which the tested adhesive may be used. When testing for aeronautic applications, materials used for airplane components may be appropriate. For example, substrate 38 may be titanium, carbon, aluminum, glass, acrylic, or a composite material. Substrate 38 has a thickness 88. The thickness may be chosen to match a part on which the tested adhesive may be used. Thickness 88 may also depend on the material of substrate 38 as, for instance, some materials may only be rigid at sufficient thickness. Thickness 88 may be between about 40 thousandths of an inch and half an inch, or any appropriate thickness of substrate 38 may be used.

Sealant 36 may be any sealant or adhesive to be tested, including for instance acrylic, epoxy, latex, or polyurethane sealants. The sealant may be applied with a thickness 90. The thickness may correspond to a testing standard, or may correspond to an intended usage. Peel media 34 may be a standard test material, providing strong adhesion to sealant 36. The peel media has a thickness 92. Any material or thickness of peel media may be used, but it may be desirable to maintain the same across tests, or to conform to a testing standard for peel media.

Figure 4:
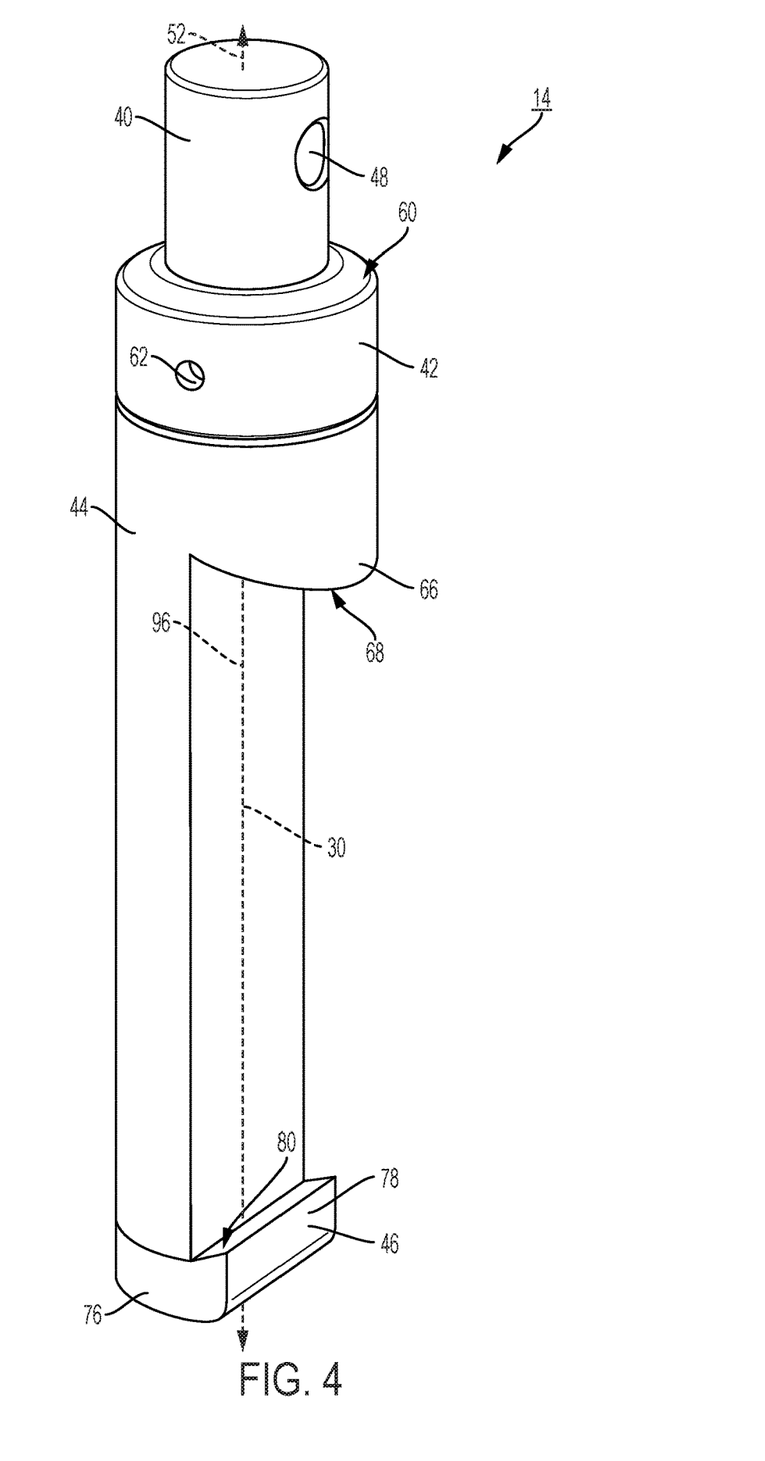
FIG. 4 is an isometric view of an exemplary jig.

FIG. 4 is an isometric view of jig 14, with foot 46 in a closest position to main body 44. Coupler 40 defines an axis 52, which may align with pulling axis 26 when jig 14 is connected to tensometer 12. Retaining nut 42 is threaded onto coupler 40 to abut main body 44, in preparation for connection to a tensometer. Prior to connection of coupler 40, retaining nut 42 may be received down over distal end 50 of coupler 40, and threaded entirely onto proximal end 56, to be proximate main body 44.

Once distal end 50 has been connected to attachment point 18, as shown in FIG. 1, retaining nut 42 may be turned up coupler 40 along axis 52 toward coupling aperture 48 until the retaining nut abuts attachment point 18. The retaining nut may be tightened to retain jig 14 firmly against the attachment, thereby securing the connection and preventing any relative motion between jig 14 and attachment point 18.

Jig 14 may be composed of machined aluminum, molded plastic, or any appropriate material. The jig may measure about 10 inches in length, may be a length appropriate to support a test panel, or may be a length appropriate to the dimensions of a tensometer. Inner faces 68, 80 of main projection 66 and lower projection 78 may be smooth, as shown, or may include textural elements to facilitate clamping a test panel. For example, the inner faces may be coated with a rubber-like material with high frictional coefficient. For another example, the inner faces may be stepped or scored.

A continuous surface of inner faces 68, 80 may be desirable to allow any thickness of test panel, within a range. An upper limit of the range may be determined by the shortest distance from an outermost point of lower projection 78 to face 28. A lower limit of the range may not be limited by a geometry of projections 66, 78, but instead may be determined by properties of the substrate material of the test panel.

As shown in FIG. 4, retaining nut 42 has a flat upper surface 60, with a chamfered edge. In other examples, upper surface 60 may be shaped to conform to a bottom surface of attachment point 18. Retaining nut 42 may be knurled or textured to facilitate hand-tightening, or may include a tooling recess 62 such as in the pictured example. The tooling recess may be configured to accept any desired tool. Some examples may not include retaining nut 42 and/or may include other means of reinforcing or securing a connection between coupler 40 and a tensometer attachment point.

Figure 5:
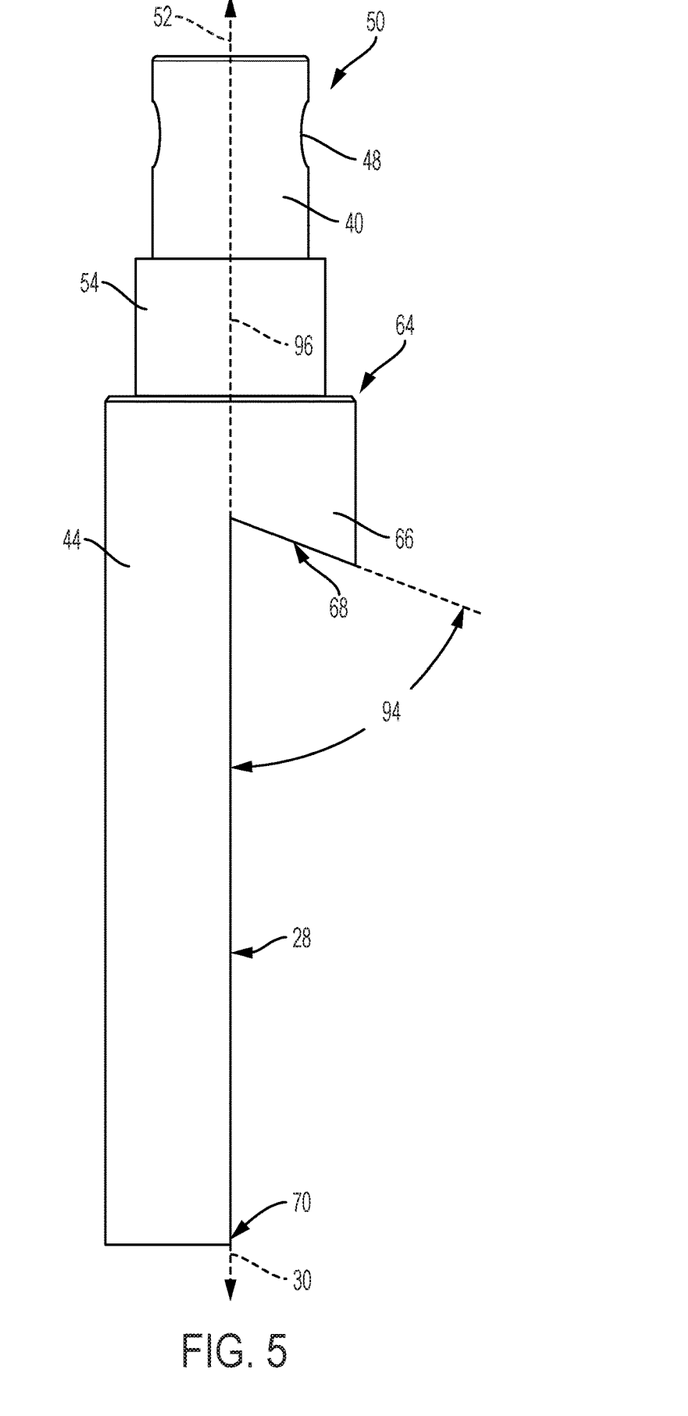
FIG. 5 is a side view of the main body of the jig of FIG. 4.

FIG. 5 is a side view of main body 44 and coupler 40 of jig 14. Inner face 68 of main projection 66 defines an angle 94 with longitudinal axis 30, as defined by face 28. Main projection 66 extends down from top end 64 of main body 44, toward bottom end 70, and out from face 28.

Angle 94 is less than 90 degrees. Such an acute angle may facilitate function of main projection 66 as a clamp jaw, allowing the projection to retain a test panel with minimal application of clamping force. Minimal clamping force may be desirable in order to secure the test panel without inducing bowing or flexing. In the pictured example, angle 94 is 70 degrees. The angle may be more, less, or may be any angle sufficient to accommodate thickness 88 of substrate 38 as shown in FIG. 3.

In the pictured example, longitudinal axis 30 coincides with a central axis 96 of main body 44 as defined by top end 64. In other words, face 28 is disposed on central axis 96, to form a half-cylinder extending to bottom end 70 of the main body. The bottom end thus has a half-disk cross sectional shape. In other examples, longitudinal axis 30 may be parallel to, but distinct from central axis 96 of main body 44. In some examples, jig 14 may be asymmetrical, or otherwise not define a central axis. Longitudinal axis 30 may also form an angle relative to central axis 96, in other words face 28 may be at an angle to the extent of main body 44.

Longitudinal axis 30 may be oriented relative to central axis 96 and coupler 40 so as to best facilitate a desired peel test. That is, longitudinal axis 30, central axis 96 and coupler 40 may be arranged such that a test panel is held in a desired orientation relative to a tensometer when the jig is connected to the tensometer.

As shown in FIG. 5, coupler 40 is centered on central axis 96 of main body 44, with coupler axis 52 aligned on both central axis 96 and longitudinal axis 30. In other examples, coupler 40 may be offset from the central axis. Coupler 40 may be formed on top end 64 of main body 44 as shown, or the coupler may be otherwise attached to the main body. For example, coupler 40 may be formed on an outer cylindrical surface of main body 44, opposite face 28. Coupler 40 may be fixedly attached to main body 44, or may be attached such that the coupler is selectively movable relative to the main body. For example, coupler 40 may be slidably mounted on main body 44, such that the coupler is securable at a plurality of positions along the extent of the main body.

Figure 6:
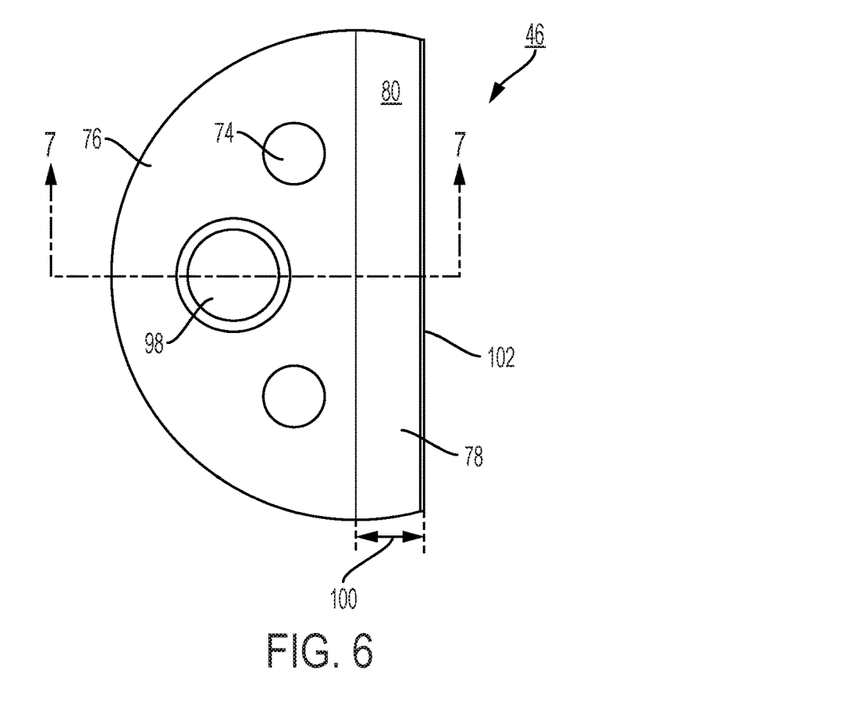
FIG. 6 is a top view of the foot of the jig of FIG. 4.

FIG. 6 is a top view of adjustable foot 46, including body portion 76 and inner face 80 of lower projection 78. An aperture 98 extends through body portion 76 to accommodate adjustment screw 72, as shown in FIG. 2. Guide rods 74 extend up from body portion 76. In the pictured example, body portion 76 has a half-disk shape and guide rods 74 are cylindrical. The body portion and guide rods may also have any effective shape.

Lower projection 78 has a depth 100, from body portion 76 to an outer edge 102. Depth 100 may be about 0.25 inches, may be between 0.25 and 0.5 inches, or may be any appropriate length. Referring also to FIG. 3, depth 100 may be less than a sum of thickness 88 of substrate 38, thickness 90 of sealant 36, and thickness 92 of peel media 34. Limiting depth 100 in such a manner may ensure clearance of peel media 34 from outer edge 102 of foot 46 during testing. Preventing contact between the peel media and the foot may be desirable to avoid interference of frictional forces during testing.

Figure 7:
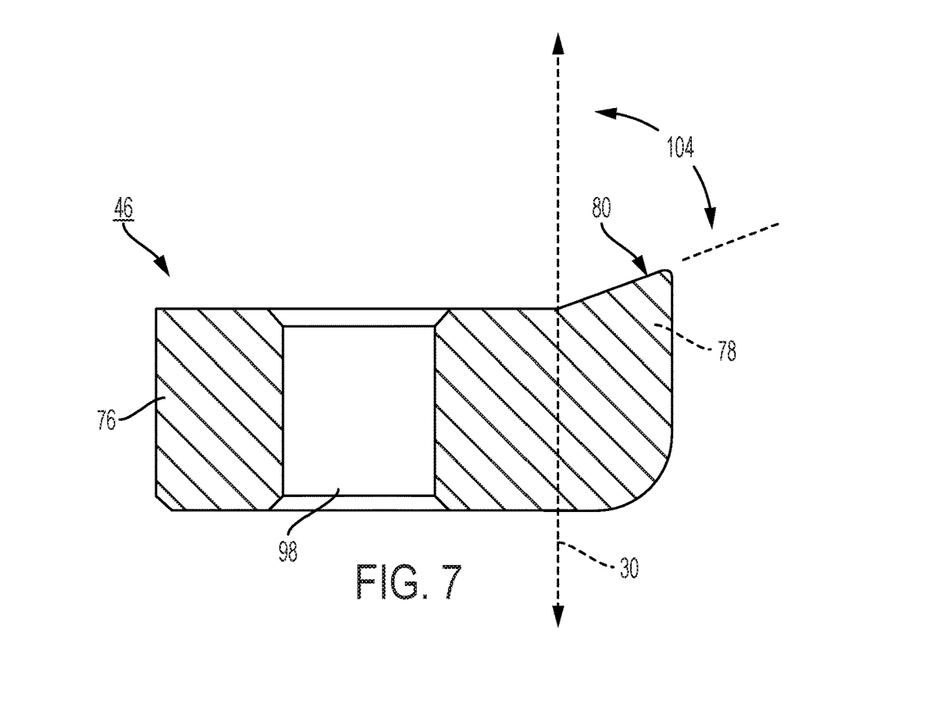
FIG. 7 is a cross-sectional view of the foot of FIG. 6, along line 7-7.

FIG. 7 is a cross-sectional view of adjustable foot 46 along line 7-7 in FIG. 6. Longitudinal axis 30 is shown as the axis would be positioned when foot 46 is assembled in jig 14, as shown in FIG. 4. Inner face 80 of lower projection 78 forms an angle 104 with longitudinal axis 30. Angle 104 may be 70 degrees, may be less than 90 degrees, or may be any effective angle.

B. Second Illustrative System

Figure 8:
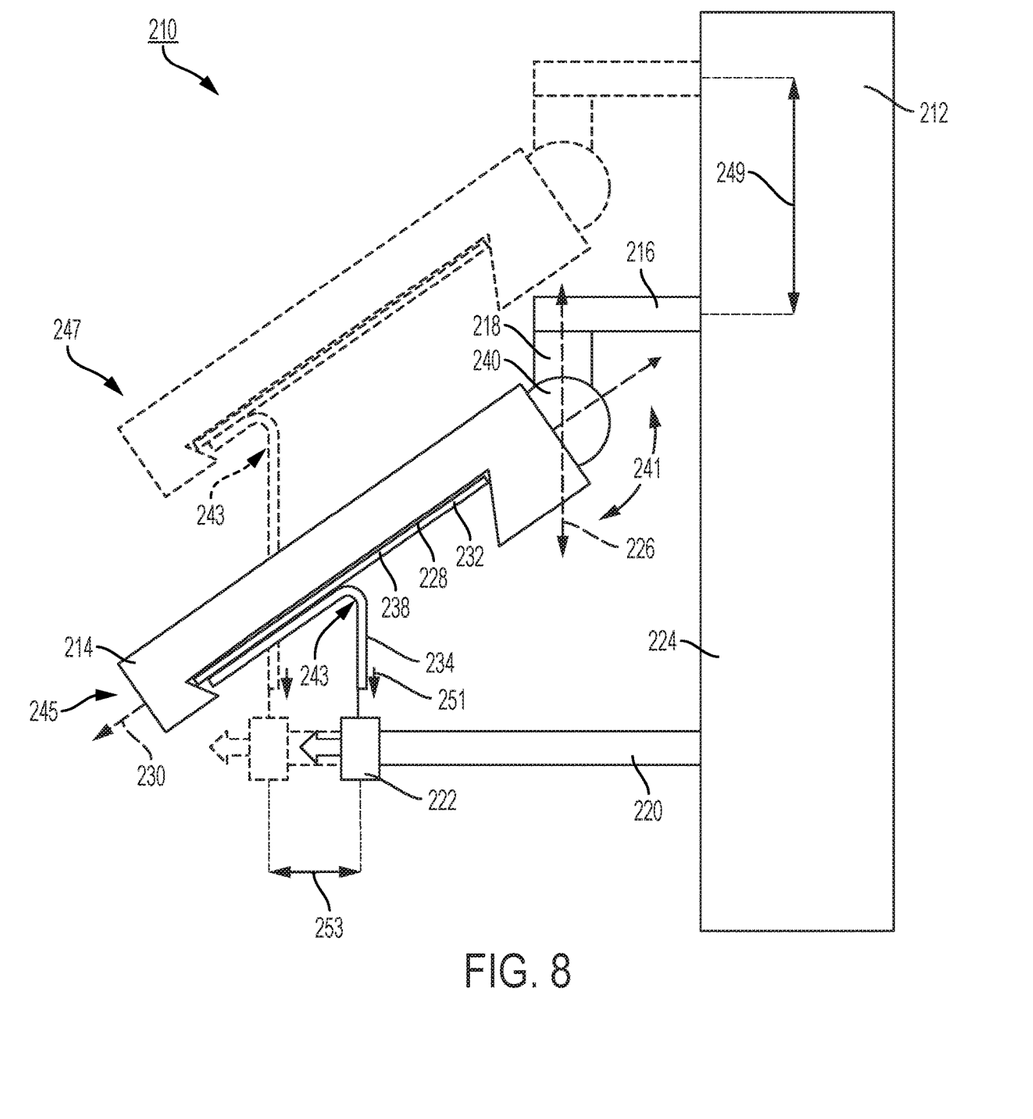
FIG. 8 is a schematic diagram of another exemplary system for adhesive testing.

As shown in FIG. 8, this section describes another system for adhesive testing 210. System 210 is another example of a system for adhesive testing as described above. Accordingly, similar components may be labeled with similar reference numbers.

A rigid spine 214, is connected to an attachment point 218 of a pull testing machine 212. The attachment point is on an upper boom 216 of the pull testing machine, and is pulled upward by a drive assembly 224 along a pulling axis 226. A face 228 of rigid spine 214 is planar and defines a longitudinal axis 230. The rigid spine is connected to pull testing machine 212 by coupling joint 240, such that longitudinal axis 230 is at an angle 241 with respect to pulling axis 226. Angle 241 is adjustable between about 90 degrees and 180 degrees.

A test panel 232, with a first end of a flexible peel media 234 adhered to a rigid substrate 238, is secured against face 228 of rigid spine 214. A second end of the peel media is gripped by a grip 222 on a lower boom 220 of pull testing machine 212. Peel media 234 is adhered to substrate 238 from the first end to a separation point 243 between the first and second ends.

FIG. 8 shows system 210 in a first position 245, and a second position 247 after upper boom 216 has been moved up a pull distance 249 by drive assembly 224. As attachment point 218 pulls rigid spine 214 up along pulling axis 226, grip 222 pulls peel media 234 down in a pulling direction 251. The pulling direction is determined by the direction from separation point 243 to grip 222.

In second position 247, separation point 243 has progressed closer to the first end of peel media 234. Effectively, separation point 243 has translated up, parallel to pulling axis 226, and over, perpendicular to the pulling axis. Therefore, in order to maintain pulling direction 251 parallel to pulling axis 226, grip 222 translates by a translation distance 253.

A mathematical relationship may be found between pull distance 249 and translation distance 253, depending on angle 241, to maintain pulling direction 251 parallel to pulling axis 226. The relationship may be expressed as, $$\Delta x = \Delta y \frac{\cos\theta}{(1 + \sin\theta)}$$

where $\Delta y$ is pull distance 249, $\Delta x$ is translation distance 253, and $\theta$ is angle 241.

In some examples, translation of grip 222 may be accomplished by transferring and transforming the upward motion of boom 216 with a wire and pulley assembly. In other examples, lower boom 220 may be extended by drive assembly 224. In such examples, the correct relationship of Δy and Δx may be calculated by an internal processor of pull testing machine 212, or may be input by a user or external system.

In some adhesion tests, Δy may vary non-linearly or unpredictably. For example, an adhesion test may include applying a constant vertical pull force, and Δy may suddenly increase when test panel 232 undergoes cohesive failure. Drive assembly 224 may include an active drive mechanism configured to translate grip 222 as needed to maintain pulling direction 251 parallel to pulling axis 226. The active drive mechanism may include programmable components, configured to receive instructions appropriate to a desired test.

Translating grip 222 may also introduce a second, lateral force into testing. Distinguishing or separating lateral translation forces and vertical adhesion releasing forces either during testing or in test results may be desirable to allow accurate analysis of results. Pull testing machine 212 may include one or more additional force sensors or load cells to separately record lateral forces. In some examples, software or physical formulas may be used to calculate lateral forces from recorded data.

C. Illustrative Device

Figure 9:
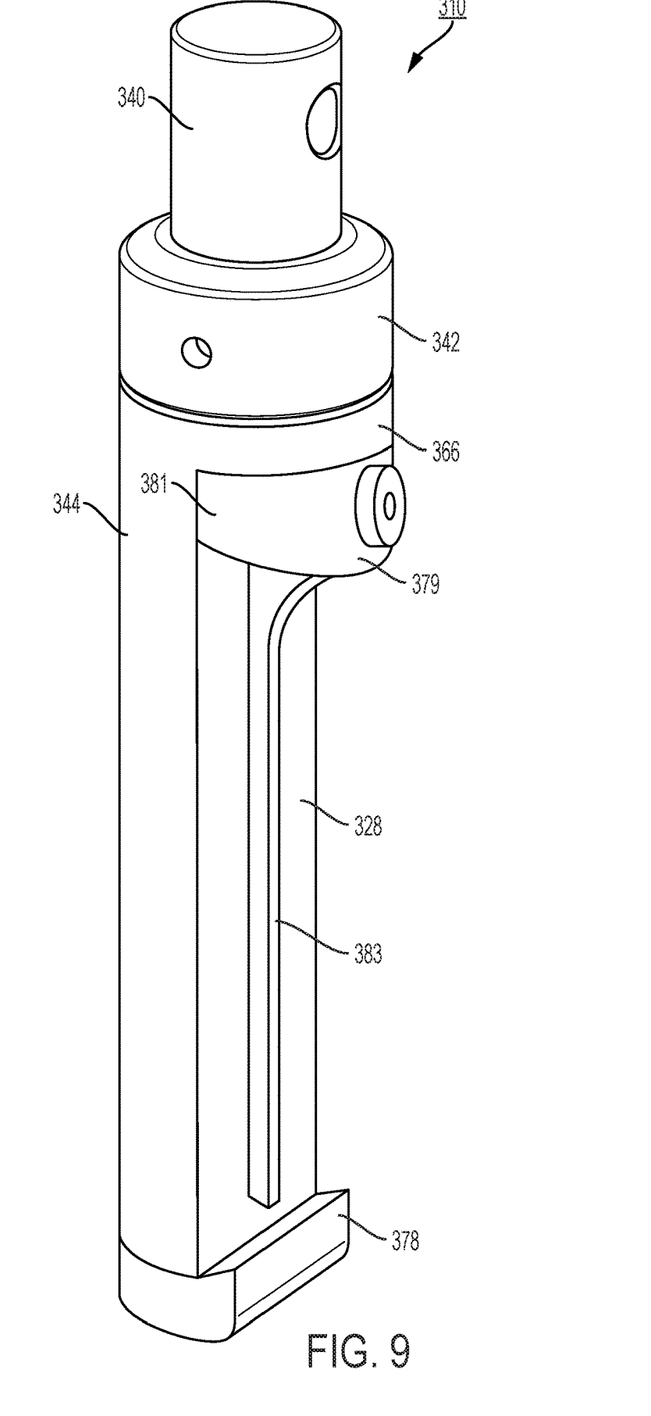
FIG. 9 is an isometric view of another exemplary jig.

As shown in FIG. 9, this section describes a grip device 310 for supporting a test article in a peel testing procedure. Device 310 includes some elements similar to systems 10 and 210. Accordingly, similar components may be labeled with similar reference numbers.

Grip device 310 includes a main body 344 with a face 328 extending between a main projection 366 and a lower projection 378. Main projection 366 is at a substantially right angle with face 328, while lower projection 378 is at an acute angle to the face. A coupler 340 is formed at a top end of main body 344, with a retaining nut 342 received on a threaded portion of the coupler. Coupler 340 may be configured to connect to a load cell of a tensometer, or other pull testing machine.

Grip device 310 further includes an insert 379. The insert has a body 381, that connects to face 328 proximate main projection 366. Body 381 may connect by means of a bolt or screw extending through an aperture in the body and into main body 344. An arm 383 extends from body 381 along some portion of face 328. In the pictured example, arm 383 extends to a point proximate lower projection 378, but does not contact the lower projection. In other examples, arm 383 may extend halfway along face 28, may extend to abut lower projection 378, or may have any desired length.

In some examples, insert 379 may be designed for a test panel with a given thickness. Some or all of the insert may be spaced from face 328 when body 381 is connected to main body 344. Insert 379 may be spaced by a distance corresponding to the given thickness of the test panel. In other examples, insert 379 may be adjustably connected to main body 344 and may be adjusted between a plurality of spacings from face 328 to accommodate different thicknesses of the test panel.

Insert 379 may serve to clamp the test panel against face 28, while lower projection 378 may support a bottom edge of the test panel. Arm 383 may retain the test panel against face 28, and may help to prevent bowing or flexing of the panel due to pulling forces applied to the panel.

D. Illustrative Method

Figure 10:
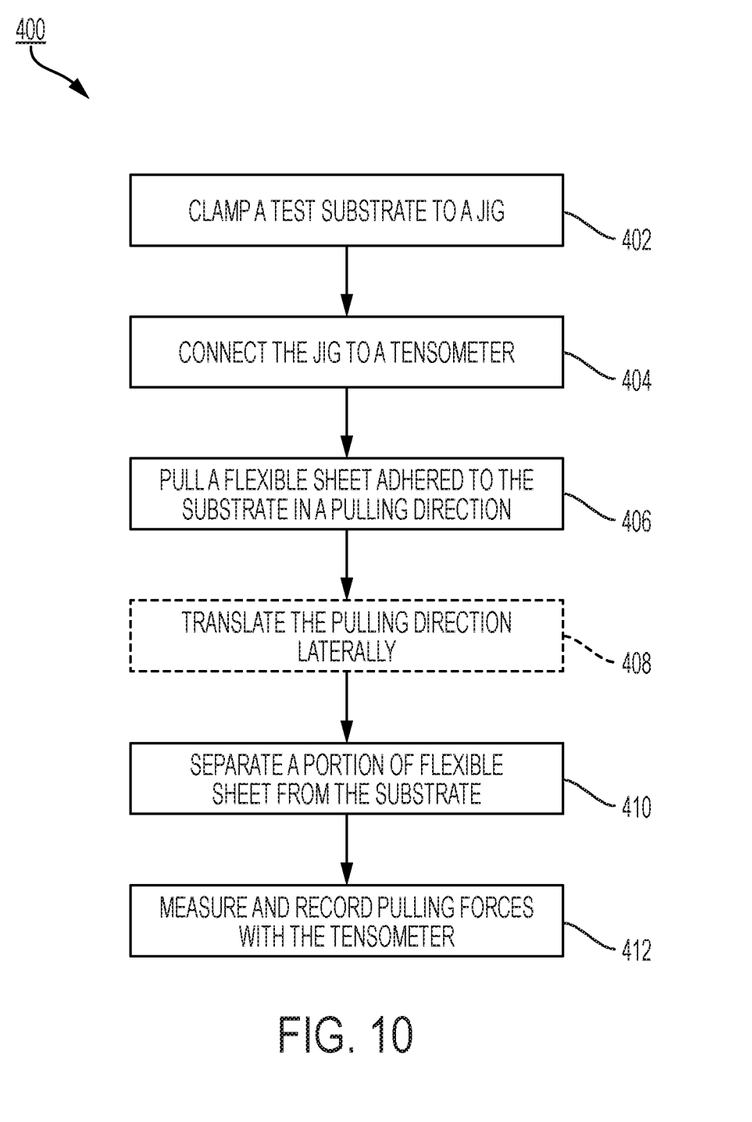
FIG. 10 is a flow chart illustrating a method of performing a peel test.

This section describes steps of an illustrative method of performing a peel test; see FIG. 10. Aspects of illustrative systems for adhesive testing or grip devices described above may be utilized in the method steps described below. Where appropriate, reference may be made to components and systems that may be used in carrying out each step. These references are for illustration, and are not intended to limit the possible ways of carrying out any particular step of the method.

FIG. 10 is a flowchart illustrating steps performed in an illustrative method, and may not recite the complete process or all steps of the method. Although various steps of method 400 are described below and depicted in FIG. 10, the steps need not necessarily all be performed, and in some cases may be performed simultaneously or in a different order than the order shown.

At step 402, the method includes clamping a test substrate to a jig. The jig may include a face and a longitudinal axis bisecting the face. The face may be defined between a first and second jaw of the jig, where the second jaw may be moved relative to the first jaw. In preparation for clamping the test substrate, the second jaw may be moved away from the first jaw and the test substrate may be laid against the face. To clamp the substrate, the second jaw may then be moved back toward the first jaw.

Step 404 includes connecting the jig to a tensometer. The jig may include a coupler configured to connect to a tensometer. For example, the jig may include a threaded portion to be received in a threaded grip of a tensometer. For another example, the jig may include a coupler with a coupling aperture sized to receive a pin of a pin-style grip of the tensometer.

In some examples of method 400, steps 402 and 404 may be performed in reverse order. That is, the jig may be connected to the tensometer prior to clamping a test substrate to a jig. Such an example of the method may be desirable when performing tests on multiple test substrates. The jig may be secured to the tensometer once, and then the remainder of method 400 may be repeated until all test substrates have been tested.

At step 406, the method includes pulling a flexible sheet adhered to the test substrate, in a pulling direction. A tail portion of the flexible sheet may be left unadhered to the test substrate, and may be secured in a grip of the tensometer. The tensometer may thereby pull the flexible sheet. The flexible sheet may be pulled at a constant rate, may be pulled at a constant force, may be pulled with gradually increasing force, or may be pulled at any rate or force appropriate for testing.

The pulling direction may be parallel to the longitudinal axis bisecting the face of the jig, or may be at an angle relative to the longitudinal axis. In some examples, method 400 may include a step of adjusting the angle between the longitudinal axis and the pulling direction. In such examples, the method may include optional step 408 of maintaining the angle as the flexible sheet is pulled, by translating the pulling direction laterally. The tensometer may include means for such translation, or the translation may be accomplished by one or more additional components coupled to the tensometer. Maintaining the angle in such a manner may be desirable in order to perform a test at a consistent angle.

Step 410 includes separating a portion of flexible sheet from the substrate. The flexible sheet may be pulled until the adhesive adhering the flexible sheet to the substrate exhibits adhesive or cohesive failure. Step 410 may be repeated along a length of the substrate. An operator or tester may cut the adhesive at regular intervals to initiate adhesive failure, or may cut the adhesive where cohesive failure occurs. The tester may perform any additional testing procedures on the substrate, adhesive, or flexible sheet as the flexible sheet is pulled.

At step 412, the method includes measuring and recording pulling forces with the tensometer. The tensometer may include force sensors of any type, and may support recording of sensed forces or loads during testing. The tensometer may also record test times, distances pulled, or other relevant data. Recorded data may be output to a computer for further analysis. In addition to information recorded by the tensometer, a tester may use further sensors to measure the testing process, or may record visual findings such as the number of cuts made, or the extent of cohesive failure.

E. Additional Examples and Illustrative Combinations

This section describes additional aspects and features of systems and methods for testing adhesives presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. A grip device for supporting a test article in a peel testing procedure, comprising:

a rigid spine having a face extending along a longitudinal axis between a first projection and a second projection, one of the projections being moveable relative to the other projection, the face being configured to support a substrate adhered to flexible media, the spine having a coupler configured to connect the spine to a pull testing machine.

A1. The grip device of A wherein the face of the spine is planar.

A2. The grip device of A, wherein the first projection forms an angle with the face of less than 90 degrees.

A3. The grip device of A, wherein each of the first and second projections forms an angle with the face of less than 90 degrees.

A4. The grip device of A, wherein the face has a ridge structure extending along the longitudinal axis separating the face into multiple longitudinal lanes.

A5. The grip device of A, wherein the coupler defines a pulling axis parallel to the longitudinal axis.

A6. The grip device of A5, wherein the longitudinal axis of the face forms an angle with the pulling axis, the angle being adjustable in a plane perpendicular to the planar face.

A7. The grip device of A6, wherein the angle is adjustable between 90 degrees and 180 degrees.

A8. The grip device of A5, wherein the coupler includes an aperture and a threaded ring, rotation of the ring causing it to move along the pulling axis toward the aperture.

B. A system for testing adhesive, comprising:

a pull testing machine including a first attachment device, a second attachment device, and a drive assembly configured to move one of the attachment devices relative to the other attachment device along a pulling axis, and a rigid spine having a face extending along a longitudinal axis between a first projection and a second projection, one of the projections being moveable relative to the other projection, the face being configured to support a substrate adhered to flexible media, the spine having a coupler for connecting the spine to the pull testing machine.

B1. The system of B, wherein the first attachment device is configured for connection to the coupler, the second attachment device being configured for connection to a flexible sheet adhered to a substrate supported by the spine.

B2. The system of B, wherein the longitudinal axis is parallel to the pulling axis.

B3. The system of B, wherein the longitudinal axis is adjustable relative to the pulling axis B4. The system of B3, wherein one of the attachment devices is moveable in a direction perpendicular to the longitudinal axis.

C. A method of performing a peel test, comprising:

clamping a pull test substrate on a rigid spine, connecting the spine to a pull test machine, and pulling a flexible sheet adhered to the substrate in a pulling direction.

C1. The method of C, wherein the pulling step includes separating a portion of the flexible sheet from a corresponding portion of the substrate.

C2 The method of C, wherein the spine has a face and a longitudinal axis bisecting the face, the longitudinal axis being parallel to the pulling direction.

C3. The method of C, wherein the spine has a face and a longitudinal axis bisecting the face, further comprising:

adjusting an angle formed between the longitudinal axis of the face and the pulling direction.

C4. The method of C3, further comprising:

maintaining the angle by translating the pulling direction laterally.

C5. The method of C, wherein the rigid spine has a face extending along a longitudinal axis between a first projection and a second projection, one of the projections being moveable relative to the other projection to clamp the pull test substrate.

Advantages, Features, Benefits

The different examples of a system for testing adhesives described herein provide several advantages over known solutions for testing adhesives. For example, illustrative examples described herein allow peel tests to be performed accurately with a tensometer. Additionally, and among other benefits, illustrative examples described herein eliminate substrate flexing.

No known system or device can perform these functions, particularly for thin or fragile substrates. Thus, the illustrative examples described herein are particularly useful for creating a consistent and repeatable process for peel testing with a tensometer. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A grip device for supporting a test article in a peel testing procedure, comprising:
    a rigid spine having a face extending along a longitudinal axis between a first projection and a second projection, one of the projections being moveable toward the other projection, the face being configured to support a substrate adhered to flexible media, the spine having a coupler configured to connect the spine to a pull testing machine,
    wherein the first projection forms an angle with the face of more than zero degrees and less than 90 degrees.

2. The grip device of claim 1 wherein the face of the spine is planar.

3. The grip device of claim 1, wherein each of the first and second projections forms an angle with the face of more than zero degrees and less than 90 degrees.

4. The grip device of claim 1, wherein the face has a ridge structure extending along the longitudinal axis separating the face into multiple longitudinal lanes.

5. The grip device of claim 1, wherein the coupler defines a pulling axis parallel to the longitudinal axis.

6. The grip device of claim 1, wherein the coupler defines a pulling axis, the longitudinal axis of the face forms an angle with the pulling axis, and the coupler includes a joint such that the angle is adjustable in a plane perpendicular to the face.

7. The grip device of claim 6, wherein the angle is adjustable between 90 degrees and 180 degrees.

8. The grip device of claim 5, wherein the coupler includes an aperture and a threaded ring, rotation of the ring causing it to move along the pulling axis toward the aperture.

9. A system for testing adhesive, comprising:
    a pull testing machine including a first attachment device, a second attachment device, and a drive assembly configured to move one of the attachment devices relative to the other attachment device along a pulling axis, and
    a rigid spine having a face extending between a first projection and a second projection, the face being elongate along a longitudinal axis, one of the projections being moveable toward the other projection along the longitudinal axis, the face being configured to support a substrate adhered to flexible media, and the spine having a coupler for connecting the spine to the pull testing machine.

10. The system of claim 9, wherein the first attachment device is configured for connection to the coupler, the second attachment device being configured for connection to a flexible sheet adhered to a substrate supported by the spine.

11. The system of claim 9, wherein the longitudinal axis is parallel to the pulling axis.

12. The system of claim 9, wherein the longitudinal axis is adjustable relative to the pulling axis.

13. The system of claim 12, wherein the drive assembly includes an active drive mechanism configured to move one of the attachment devices in a direction perpendicular to the pulling axis.

14. The system of claim 9, wherein each of the first and second projections forms an angle with the face of more than zero degrees and less than 90 degrees.

15. The system of claim 9, wherein the face has a ridge structure extending along the longitudinal axis separating the face into multiple longitudinal lanes.

16. A method of performing a peel test, comprising:
    clamping a pull test substrate on a rigid spine by moving a first projection of the rigid spine toward a second projection of the rigid spine,
    connecting the spine to a pull test machine, and
    pulling a flexible sheet adhered to the substrate in a pulling direction,
    wherein the rigid spine has a planar face extending between the first projection and the second projection, the face being elongate along a longitudinal axis, and the first projection being moveable toward the second projection along the longitudinal axis to clamp the pull test substrate.

17. The method of claim 16, wherein the pulling step includes separating a portion of the flexible sheet from a corresponding portion of the substrate.

18. The method of claim 16, wherein the spine has a face and a longitudinal axis bisecting the face, the longitudinal axis being parallel to the pulling direction.

19. The method of claim 16, wherein the spine has a face and a longitudinal axis bisecting the face, further comprising:
    adjusting an angle formed between the longitudinal axis of the face and the pulling direction.

20. The method of claim 17, further comprising:
    maintaining the angle by translating the pulling direction laterally.

* * * * *